UNITED STATES PATENT OFFICE.

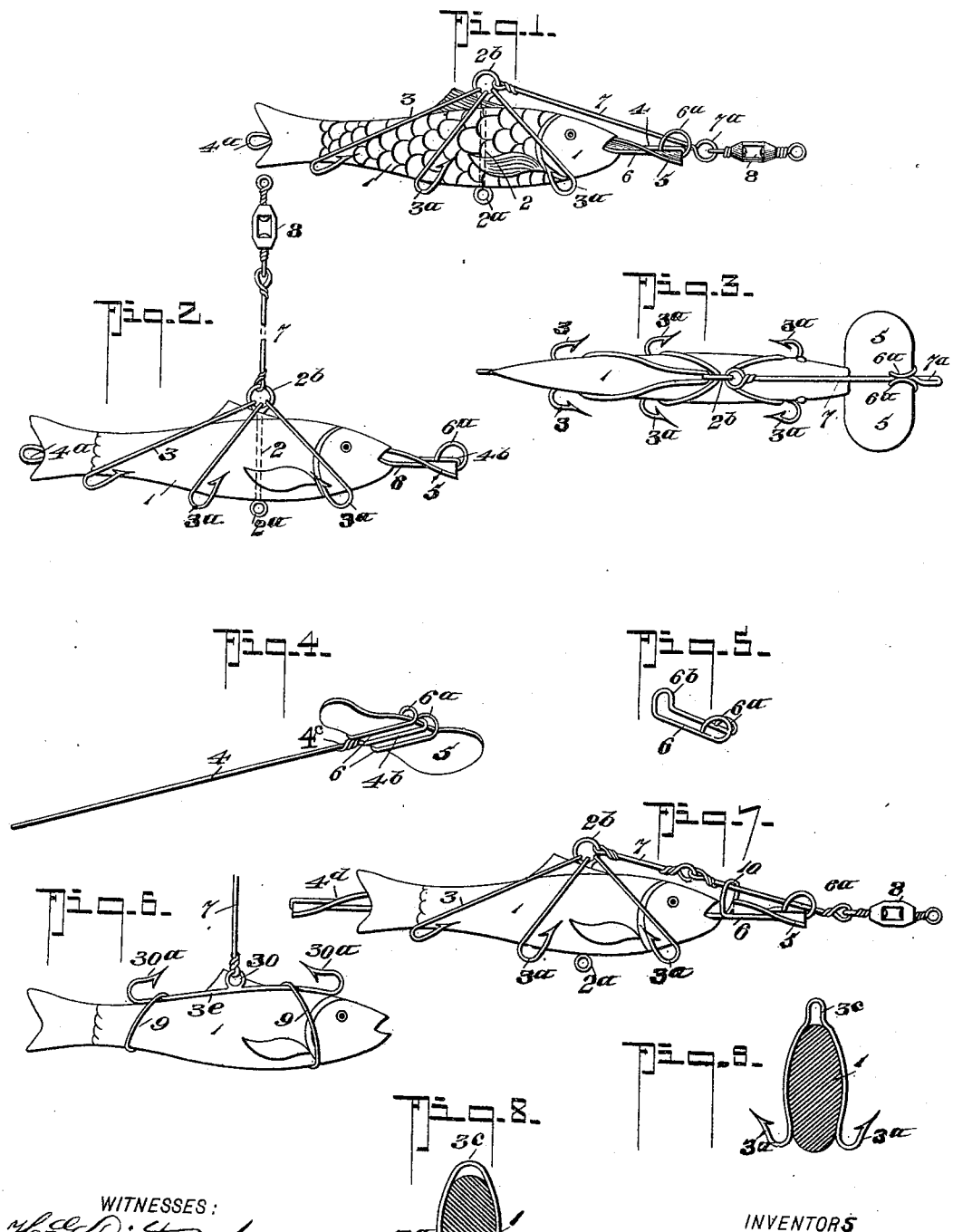

MORRIS W. VOTAW, OF BOWLING GREEN, AND MARTIN E. THOMAS, OF CASSADAY, KENTUCKY; SAID THOMAS ASSIGNOR TO SAID VOTAW.

ARTIFICIAL BAIT.

SPECIFICATION forming part of Letters Patent No. 643,573, dated February 13, 1900.

Application filed March 18, 1899. Serial No. 709,596. (No model.)

*To all whom it may concern:*

Be it known that we, MORRIS W. VOTAW, of Bowling Green, and MARTIN E. THOMAS, of Cassaday, in the county of Warren, State of Kentucky, have invented certain new and useful Improvements in Artificial Bait, of which the following is a specification.

This invention is in the nature of an improved artificial bait or lure, and it primarily seeks to provide a device of this character very inexpensive, which can be conveniently handled and adjusted to serve as a complete and attractive stationary bait or as a spinning-troll.

This invention comprehends a novel arrangement of barb clamps or hooks, an artificial minnow, a spoon member, and means in the nature of clamps and tension-spring devices capable of instantaneous adjustment, whereby to set the bait as a stationary minnow-bait or trolling-lure.

In its subordinate features this invention consists in certain details of construction and combination of parts, all of which will be first described and then pointed out in the appended claims, reference being had to the accompanying drawings, in which—

Figure 1 is a side elevation of our improvement, the same being arranged as a trolling-lure. Fig. 2 is a view showing the same arranged as a stationary bait. Fig. 3 is a plan view of the device arranged as in Fig. 1. Fig. 4 is a detail perspective view of the spoon member. Fig. 5 is a detail view of the combined spoon-blade holder and clamp-spring. Figs. 6 and 7 are detail views of a modified construction of our improved bait, hereinafter specifically referred to. Figs. 8 and 9 are cross-sections of the bait-body, showing the manner of clamping the hooks thereon.

In the practical construction of our invention the body of the bait proper, 1, is made of soft flexible material, preferably rubber, and decorated to closely resemble a live minnow. Passed vertically through the body of the bait is a wire rod 2, turned at the lower ends, as at $2^a$, to prevent its being pulled up through the bait-body, its upper ends terminating in an eye $2^b$, the purpose of which will presently appear.

$3\ 3^a\ 3^a$ represent a series of hooks or barbs which are in the nature of double hooks. These hooks are each made of a single member bent upon itself to form a clamping-body adapted to straddle the bait-body and fixedly seat thereon at any angle desired, the loop ends $3^c$ of such hook-bodies being arranged to engage with the eye $2^b$ of the rod 2, and thereby be firmly connected with the bait-body. By forming the hook members as described it is manifest that when fitted on the bait-body they are kept in their proper position by their own spring-pressure against the said bait-body (see Figs. 8 and 9) and cannot dangle loosely thereover to entangle the line.

If desired, the hook members may be attached to the bait-body in any well-known manner; but we prefer to attach them as described and shown, for the reason that their position of attachment is maintained, and as they have barbs projecting from each side of the bait-body it insures a catch when a strike is made at the bait. Furthermore, by attaching the hooks in the manner stated should any one of them break another can be readily replaced without making a tie, loop, or winding to secure it, said hooks being so formed that they are attachably secured in the line-ring $2^b$, sprung astride the bait-body 1, and capable of being held clamped on said body 1 in any position to suit the views of the angler.

4 designates what we term the "troll-rod," which is passed longitudinally through the bait-body and has its ends projected through the rear fin of the bait and turned, as at $4^a$, to prevent its withdrawal. The front end of the rod 4 is projected through the mouth of the bait forwardly and terminates in a flat elongated loop $4^b$, (see Fig. 4,) its end being made fast to its body portion by winding, as shown at $4^c$ in Fig. 4.

Within the loop $4^b$ is fixedly held the trolling spoon or blade 5. The rod 4 is fixedly held with the body 1, and the spoon or blade 5 is so formed that when the bait is drawn forward in the water, the parts being as shown in Fig. 1, the entire bait will act as a spinning-troll.

While the use of a spoon or blade at the head end of the bait will serve to cause the bait to spin as it is trolled, a second blade $4^d$ may be added to the tail end of the bait, as shown in Fig. 7, to make the bait the more conspicuous.

7 indicates the pull-rod, which is connected at its lower end to the eye $2^b$ and has its upper end formed with an eye $7^a$ to receive the swivel 8, to which the line is attached.

When it is desired to use our improved line as a stationary bait, the parts are arranged to assume the position shown in Fig. 2, in which the rod 7 is free to swing from the eye $2^b$ and leave the bait to assume a natural swinging position.

To change the device to a spinning-troll, it is only necessary to bring the rod 7 down to the position shown in Fig. 1 and make it fast to such position. For this purpose and to permit the change of position of the rod 7 being instantly made we employ a spring device 6, (shown in detail in Fig. 5,) comprising a spring-wire bent upon itself and having its inner or loop end bent up, as at $6^b$, to straddle the end of the rod 4 and having its free ends bent up to form eyes $6^a$, that are bent to close against each other, as best shown in Fig. 3, the said eyes $6^a$ also forming the clamp means for holding the device 6 securely on the spoon or blade. The eyes $6^a$ are in a plane with the forward swing of the rod 7, whereby the rod can be conveniently clamped when swung down between the clamp members $6^a$.

When desired to use the device as a stationary bait only, the rod 4, together with its attached members, can be removed by straightening its turned end $4^d$ to permit its withdrawal from the body 1, and when thus used a single hook member $3^e$, having a central eye 30 and barbs $30^a$ at the opposite ends, is detachably held back of the bait by clamp-rings 9, as illustrated in Fig. 6.

In Fig. 7 is illustrated another modification of our invention. In this form the rod 7 is made of two sections having a jointed connection, and the forward section when the bait is to be used as a troll is passed through a fixedly-held eye 10, projected up from the rod 4. In this form to change the device from a trolling lure or bait to a stationary bait it is only necessary to disconnect the line from the swivel 8 and pull the member 7 backward, with the swivel 8, through the eye 10. In this latter form the spring device 6 can be dispensed with.

Other modifications in the detail of construction might readily be made without departing from the scope of the appended claims.

Having thus described our invention, what we claim, and desire to secure by Letters Patent, is—

1. An artificial bait comprising a flexible body; a line-attaching eye projected therefrom; and hook members connected with the said eye adapted to be clamped against the flexible body.

2. An artificial bait, comprising a flexible body; a line-attaching eye projected from the back thereof; and hooks detachably hung in the said eye—said hooks being formed to straddle the flexible body and be held clamped thereon by spring-pressure, substantially as shown and described.

3. An artificial bait, comprising a body having barbs, a trolling spoon or blade projected longitudinally therefrom; a line-attaching member pivotally secured to the back of the bait-body, and adapted to swing down and to project forwardly of the bait; and means for holding said member to its down position, whereby a pull on the line will cause the bait to act as spinning-troll, as set forth.

4. The combination with the bait-body and the barb secured thereto, of the rod 4, the spoon or blade 5, the clamp device 6, the eye $2^b$, and the swinging rod 7, all being arranged substantially as shown and described.

5. An improved bait or lure, comprising a minnow-shaped body formed of a flexible material, a line-attaching rod member pivotally secured to the back of the minnow-body, a series of U-shaped spring-hook members held to straddle the minnow and held spring-pressed thereon, the rod 4, having a tailpiece $4^d$, and a loop $4^b$, the spoon or blade 5, and the device 6, having the loop $6^b$, and the spring-clamp members $6^a$, all being arranged substantially as shown and described.

In testimony whereof we have hereunto set our hands in presence of two subscribing witnesses.

MORRIS W. VOTAW.
MARTIN E. THOMAS.

Witnesses:
FRANK POTTER,
THOS. W. THOMAS.